April 4, 1961 P. M. STIGLIC ET AL 2,977,968
PRESSURE RELAY
Filed April 29, 1958 2 Sheets-Sheet 1

Inventors
Paul M. Stiglic
Daniel J. Shramo
by Hill, Sherman, Meroni, Gross & Simpson Attys

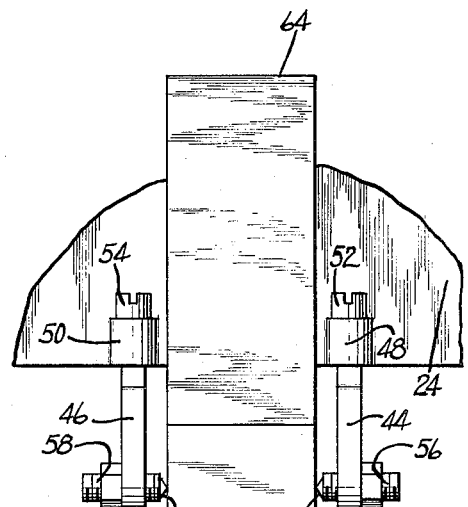
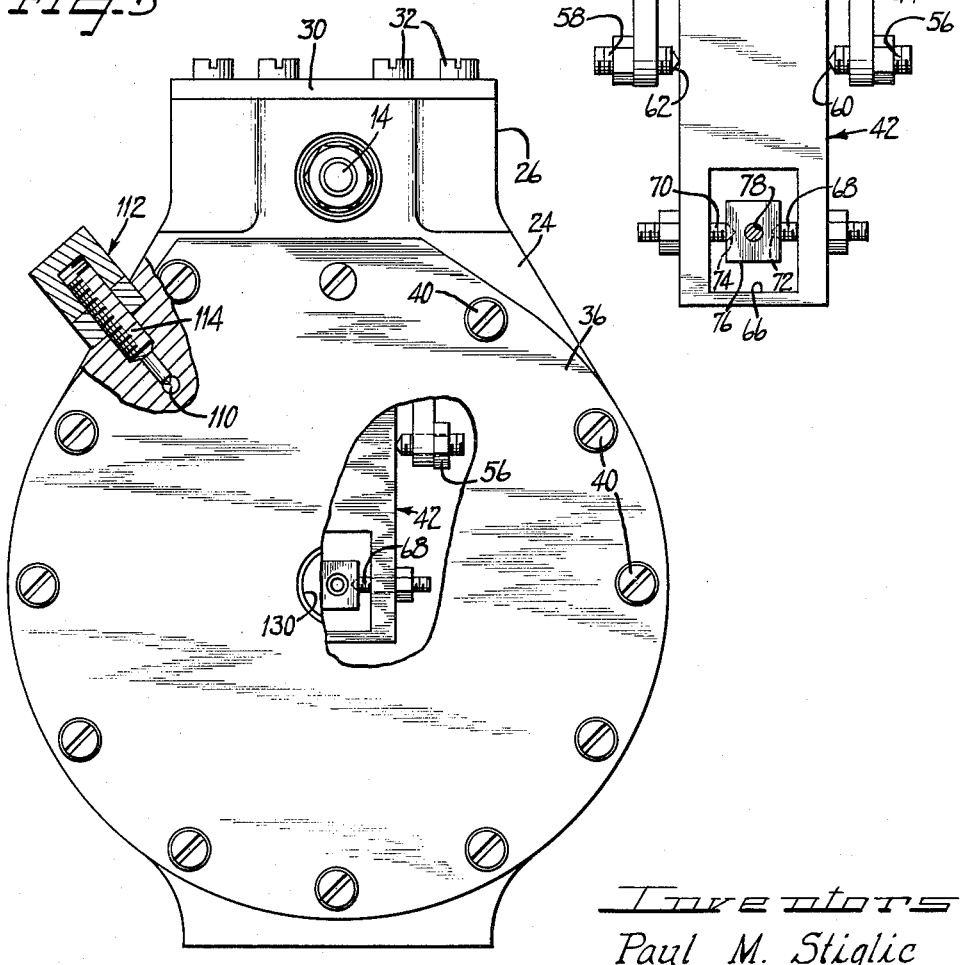

United States Patent Office 2,977,968
Patented Apr. 4, 1961

2,977,968

PRESSURE RELAY

Paul M. Stiglic, Wickliffe, and Daniel J. Shramo, Willoughby, Ohio, assignors to Thompson Ramo Wooldridge Inc., a corporation of Ohio Filed Apr. 29, 1958, Ser. No. 731,835

7 Claims. (Cl. 137—86)

The present invention relates to improvements in pressure relays, and more particularly to a relay which receives a pneumatic input signal and produces a control signal which is a proportional plus an integral function of the input signal.

Remote controllers are in general use in many environments, such as in manufacturing plants for producing a signal output control in response to an input control at a remote location. Controls have been used which produce an output signal which is a proportional as well as an integral function of an input signal.

The advantages of pneumatic controls are useful in many environments, such as for high temperature operation or operation in contaminated environments, such as where radiation is present. Pneumatic controllers are useful in industries where it is economically feasible to use available planned air sources rather than installing additional power sources, such as hydraulic or electrical equipment. In many control environments, it is important to provide a pneumatic relay control which will have an output pressure signal which is a proportional as well as an integral function of an input signal. It is a feature of the present invention to provide an improved pneumatic relay of this type. It is also a feature of the invention to provide an improved pneumatic relay with adjustments which enable variance of the time constants and gain of the integral output signal.

Accordingly, it is an object of the present invention to provide an improved pneumatic relay which is capable of producing an output signal which is both a proportional function and an integral function of an input signal.

Another object of the invention is to provide a generally improved pneumatic control relay.

A still further object of the invention is to provide a pneumatic relay which will provide an output signal as an integral function of an input signal wherein the output may be adjustably controlled.

A further object of the invention is to provide an improved pressure controlled relay with a pressure output signal wherein the relay has an improved follow-up signal arrangement.

A further object of the invention is to provide a pneumatic relay of improved mechanical structural features for simplified and improved manufacture and assembly and for reduction in manufacturing costs.

A still further object of the invention is to provide an improved pressure controlled relay which is capable of producing an output pressure signal that is in accurate, and rapid response to a pressure input signal.

Other objects and advantages will become more apparent with the teaching of the principles of the invention in the disclosure of the preferred embodiment in the specification, claims and drawings, in which:

Figure 2 is a sectional view taken substantially along line II—II of Figure 1, and illustrating the general structure of the valve flapper of the mechanism of Figure 1;

Figure 3 is an elevational view showing one side of the control mechanism of Figure 1, with parts broken away to illustrate details; and, Figure 4 is a graph illustrating pressure change plotted against time for the different chambers of the mechanism of Figure 1.

As shown in the drawings:

Figure 1:
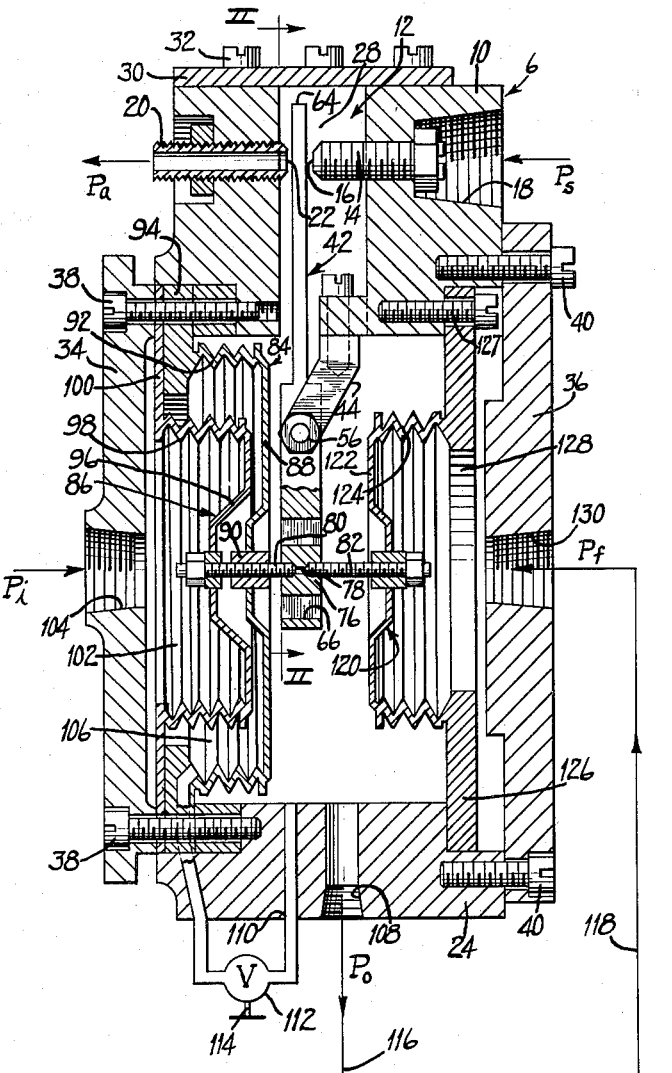
Figure 1 is a sectional view taken through a control relay embodying the principles of the present invention.

A pneumatic relay assembly structure is illustrated in Figure 1 with a relay 6 connected to control a load 8. The relay 6 includes a housing 10 which defines a first chamber 12 therein. Within the first chamber 12 is produced a pressure that is utilized as the output or control signal for the relay.

An operating air supply for the relay is furnished through an inlet tube 14 which terminates in an inlet orifice 16 within the chamber 12. The inlet tube 14 is secured within an opening 18 in the wall of the casing 10, and the opening is threaded so as to attach an air supply tube. Air is supplied to the inlet tube 14 at a substantially constant pressure $Ps$.

Leading from the chamber 12 is an exhaust or an outlet tube 20 which has at its inner end an outlet orifice 22 leading from the chamber 12. The outlet orifice 22 is positioned opposite to and in spaced relationship to the inlet orifice 16 for simultaneous control of the flow through these orifices. The outlet tube 20 discharges into the ambient air at a pressure $Pa$, and is mounted in an opening in the wall of the casing 10.

The casing 10 is shown as being somewhat cylindrical in shape with an annular wall 24, Figures 1 and 3, and the annular wall 24 tapers to a boss 26 at one end. An opening 28 extends through the boss 26 for accommodating the location of the inlet and outlet orifices 16 and 22. A plate 30 is bolted over the opening, such as by bolts 32 extending in the casing. At each side of the annular wall 24 of the casing are attached flat plates 34 and 36. Plate 34 is held in place by circumferentially spaced annularly arranged bolts 38 screwed into the threaded openings in the annular wall 24. The plate 36 is held to the casing by bolts 40 which are circumferentially spaced and annularly arranged around the edge of the plate 36, and screwed into threaded holes in the annular wall 24. Suitable gaskets may be provided between the plates 34 and 36 in the annular wall 24.

Flow into and out of the first chamber 12 through the inlet orifice 16 and out of the outlet orifice 22 is controlled by a movable control valve member 42 which is illustrated in the form of a pivotal flapper plate.

As illustrated in Figures 1 and 2, the valve member 42 is supported on brackets 44 and 46, which are secured to project downwardly from bosses 48 and 50, projecting into the chamber 12 from the wall 24 into the opening 28 in the wall. The brackets are supported by bolts 52 and 54.

At the lower ends of the brackets 44 and 46 are adjustable pivot screws 56 and 58 which are threaded into the brackets and which have pivot points 60 and 62 extending into conical recesses in the sides of the valve member 42. The valve member 42 is thus suspended for free pivotal movement so that the upper flat end 64 can move freely between the inlet and outlet orifices 16 and 22 to control the flow therethrough.

The valve member is moved by lateral forces applied at the lower end to cause it to pivot. At the lower end of the valve member 42, it is broadened and formed with a rectangular opening 66. Extending through the sides of the rectangle are pivot pins 68 and 70 having conically pointed tips 72 and 74 to project into conical recesses in a pivotal block 76. The block is thus mounted for a minimum of frictional resistance so that lateral forces on the block will pivot the valve member flapper 42

The block 76 has a threaded opening 78 extending through the center to receive bellows pins 80 and 82 which are screwed into the block 76.

Bellows pin 80 is mounted on a first bellows 84 and also on a second bellows 86.

The bellows 84 has a rigid wall part 88 with a threaded boss 90 at the center to receive the bellows pin 80. At the edge of the circular wall 88 is an annular expansible wall 92 of the bellows, which is preferably formed from opposed welded together conical washers. These washers will not have the hysteresis loss encountered with conventional bellows. The expansible wall 92 is anchored at its base on an annular ring 94 which is clamped by the bolts 38 which hold the plate 34 to the side of the casing.

The bellows 86 is nested within the bellows 88 and includes a circular bellows wall 96 attached at its edge to an annular flexible bellows wall 98, which is secured at its base to an annular ring 100. The ring 100 supports the bellows by also being clamped by the bolts 38. The inner nested bellows 86 forms a second chamber 102 between the bellows and the plate 34. At the center of the plate 34 is formed a passage 104 for connecting a conduit or the like to expose the second chamber 102 to an input signal pressure. A signal pressure P$i$ is directed into the chamber 102. The input pressure P$i$ will usually be a static pressure and can be a pressure from a fluid having a minimum or low flow with the relay producing an output pressure P$o$, which is in accurate response to the input pressure P$i$, and which provides a pressure of increased operating capacity. The input pressure signal P$i$ may be obtained from a transmitter controller or a relay and produces an output pressure signal P$o$, which is a proportional plus an integral control response. The response is also adjustable to vary the rate of integration or time constant.

A third chamber 106 is defined between the two nested bellows 84 and 86. Inasmuch as the walls 88 and 96 of the two bellows are of different area, with other pressures remaining static, an increase in pressure in the third chamber 106 will cause an expansion of the interconnected bellows or a movement to the right of the bellows pin 80. A reduction in pressure in the third chamber 106 will cause a contraction of the bellows or a movement of the bellows pin 80 to the left, as shown in Figure 1. The principle of this action caused by the difference in size of the bellows attains the integral output pressure.

With an increase in signal pressure in the chamber 102, the nested bellows unit moves to the right, as shown in Figure 1, thereby moving the valve flapper or member 42 in a direction so that its upper end 64 moves to the left to increase the pressure in the first chamber 12. The pressure in the chamber is measured through an output flow signal passage 108, which extends through the wall of the casing 6 and permits the output pressure signal P$o$ to be transmitted to the load 8.

The increase in pressure is transmitted from the first chamber 12 to the third chamber 106 through a positive feedback conduit 110 which is shown schematically in Figure 1, and shown as structurally related to the mechanism in Figure 3. As the pressure increases in the first chamber 12, it will also increase in the third chamber 106, and because of the difference in size of the bellows, the bellows assembly will tend to continue to move to the right thereby continuing the movement of the valve member 42, and continuing the increase of pressure in the chamber 12. The rate of flow from the first chamber 12 to the third chamber 106 is controlled by a positive feedback control valve 112. As illustrated in Figure 3, the valve 112 includes an adjustable stem 114, which adjusts the rate of flow to the conduit 110. The rate of flow through the valve 112 will control the rate of integration or time constant of the change of the output signal P$o$ relative to the input signal P$i$. Thus, the second bellows 86 will cause a change in pressure in the first chamber 12 which is proportional to the input signal and the action of the nested bellows 84 and 86 will cause the output pressure P$o$ to be an integral function of the input pressure P$i$.

Figure 4:
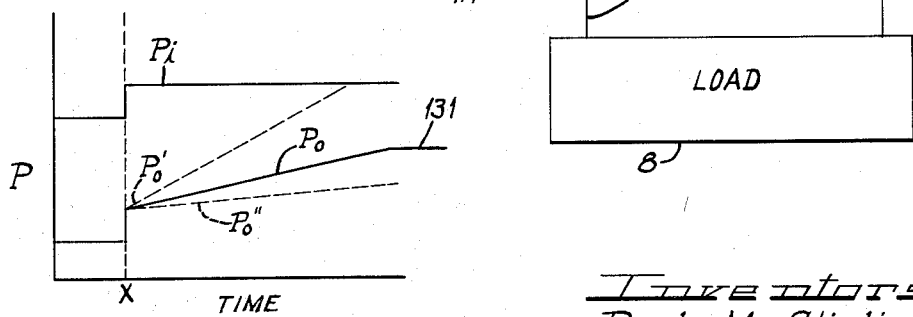

This action may be observed by viewing the graph of Figure 4. In the graph, pressure is plotted against time. At a time X, the input pressure is increased as illustrated by the upper line P$i$. This creates a substantially immediate increase in the first chamber to cause P$o$ to rise. From the time X, P$i$ remains constant but the flow continues to increase as an integral function. This is indicated by the solid line P$o$. Since the rate of integration or time constant is variable, output pressures for a time period such as indicated by the line P'$o$ can be obtained by opening the valve 112 to increase the rate. With a decreased rate, such as is achieved by closing the valve, an output pressure response over a period of time, such as indicated P''$o$ may be achieved. It will be recognized that rates in between these ranges may be readily achieved by changing the opening of the valve 112. If the valve 112 is completely closed, the output pressure will only be a proportional function of the input pressure, and the graph line P$o$ will be horizontal and parallel to the graph line P$i$.

In the embodiment illustrated in the drawings, a negative feedback signal is supplied to the relay to terminate the integrated increase of output pressure P$o$. This is achieved by supplying a feedback pressure in accordance with the action of the load.

As may be seen in Figure 1, the output pressure P$o$ is supplied through a line 116 to the load, which acts in accordance with the output pressure signal and which will generate a feedback signal at a pressure P$f$, and transmit it to line 118 back to the relay. For this purpose, within the relay casing is third bellows 120. This bellows has a circular rigid bellows wall 122 with an expansible annular wall 124, also preferably formed of opposed welded conical washers to avoid hysteresis losses. The flexible wall 124 is mounted at its base on an annular ring 126 which is sealingly secured within the casing 6 by circumferentially spaced bolts 127 threaded into the annular wall 24 of the casing. The third bellows 120 defines a fourth chamber 128 within it, which is closed by the plate 36. A passage 130 is formed through the plate 36 for connecting the line 118 to transmit the feedback pressure signal to the chamber 128. As the feedback signal increases in accordance with the operation of the load 8, the bellows 120 will expand to transmit a force through the bellows pin 82 to the valve flapper 42 and stabilize it. This will cause the pressure line P$o$, as shown at 131 in Figure 4, to level off and bring the relay to a stable position.

In summary, as the input pressure P$i$ increases, the pressure in the second chamber 102 increases to move the lower end of the valve flapper 42 to the right, as shown in Figure 1. This moves the upper end 64 away from the inlet orifice 16, and toward the outlet orifice 22 to increase the pressure in the first chamber 12. This increase is a proportional function of the input pressure P$i$, and is measured as P$o$ through an outlet passage 108 leading from the first chamber 12. As soon as the pressure increases in the first chamber 12, this pressure is fed through a feedback conduit 110 to the third chamber 106. At the third chamber, the nested bellows 84 and 86, which are of different size, will tend to move to the right with pressure increase. This will move the upper end of the valve flapper still further to the left, to further increase the pressure in the chamber 12. As a result, the output pressure P$o$ will be an integral function of the input pressure P$i$. The relation between the increased input pressure and the increased output pressure is shown in Figure 4. If the input pressure P$i$ is dropped, it will cause an opposite effect to be encountered with the pressure in the first chamber dropping as a proportional and an integral function of the drop in input pressure P$i$. The output pressure P$o$ is supplied to a load 8, and the load generates a feedback pressure $Pf$, which is supplied to the fourth chamber 128. This acts on the bellows 120, which acts in an opposite direction on the valve flapper to stabilize its movement and to terminate the integral change.

The output $Po$ of the pneumtaic controller is a proportional plus an integral control response of the error signal, which is $(Pi-Pf)$. The proportional response is obtained from $Po$ feedback on the differential area of bellows 88 and 120. The integral response is obtained by feeding pressure $Po$ into chamber 106.

Thus it will be seen that we have provided an improved pneumatic relay or control which meets the objectives and advantages hereinbefore set forth. The mechanism is reliable in operation and is well suited to operation in locations wherein the advantages of a pneumatic relay are important.

We have, in the drawings and specification, presented a detailed disclosure of the preferred embodiments of our invention, and it is to be understood that we do not intend to limit the invention to the specific form disclosed, but intend to cover all modifications, changes and alternative constructions and methods falling within the scope of the principles taught by our invention.

We claim as our invention:

1. A pneumatic relay comprising a first chamber having an inlet orifice opening into the chamber and an outlet orifice opening from the chamber, a movable control valve member positioned to change the flow through the inlet and the outlet orifices with movement, a second chamber having an inlet opening to receive an input pressure signal, a first movable wall exposed to the pressure in said first chamber, a second movable wall having one surface exposed to the pressure in said second chamber and being of an area less than said first wall, means forming a third closed chamber between said walls, means interconnecting said first and second walls to said valve member whereby movement of the walls will change the pressure in said first chamber by moving said valve member in a direction to cause a corresponding change in pressure for the first chamber, a signal outlet passage leading from the first chamber to a load to supply an output pressure signal, a fourth chamber having a movable wall connected to said valve member to move it in opposition to said first and second walls, a feedback passage for leading from the load to supply a feedback pressure indicative of the response of the load to said output pressure signal, and a passage communicating between said first and third chambers whereby change in pressure in said first chamber will cause a corresponding change in said third chamber and a progressive movement of the valve member due to the difference in areas in said first and second walls whereby the pressure in the first chamber will change as an integral function of the pressure change in the second chamber until the feedback pressure in the fourth chamber stops movement of the valve member.

2. A pneumatic relay comprising a first chamber having an inlet orifice opening into the chamber and an outlet orifice opening from the chamber, a movable control valve member positioned to change the flow through the inlet and the outlet orifices with movement, a second chamber having an inlet opening to receive an input pressure signal, a first movable wall exposed to the pressure in said first chamber, a second movable wall having one surface exposed to the pressure in said second chamber and being of an area less than said first wall, means forming a third closed chamber between said walls, means interconnecting said first and second walls to said valve member whereby movement of the walls will change the pressure in said first chamber by moving said valve member in a direction to cause a corresponding change in pressure for the first chamber, a signal outlet passage leading from the first chamber to a load to supply an output pressure signal, a fourth chamber having a movable wall connected to said valve member to move it in opposition to said first and second walls, a feedback passage for leading from the load to supply a feedback pressure indicative of the response of the load to said output pressure signal, a passage communicating between said first and third chamber whereby change in pressure in said first chamber will cause a corresponding change in said third chamber and a progressive movement of the valve member due to the difference in areas in said first and second walls whereby the pressure in the first chamber will change as an integral function of the pressure change in the second chamber until the feedback pressure in the fourth chamber stops movement of the valve member, and an adjustable restricting valve in said passage to selectively control the rate of flow therethrough whereby the time constant of the integrated rate of change in pressure in the first chamber is controlled.

3. A pneumatic relay comprising in combination a casing enclosing a first chamber therein, an inlet conduit having an inlet orifice opening into the first chamber, an outlet conduit having an outlet orifice opening from the first chamber and spaced from and opposed to the inlet orifice, a movable control valve member located within the first chamber and movable between said orifices to simultaneously control the flow therethrough, a first bellows having a movable wall exposed to the first chamber, a second bellows located substantially concentric with the first bellows and nested therein and forming a second chamber within the second bellows, said second bellows having a wall and forming a third chamber between said first and second bellows, means mechanically connecting the walls of said first and second bellows to the valve member whereby changes in pressure in said chambers will cause movement of the bellows and corresponding movement of the valve member, an inlet passage leading into said second chamber for admission of a pressure signal, a conduit connecting between said first and third chambers whereby change in pressure in the first chamber due to movement of the valve member will cause a corresponding change in pressure in the third chamber and said first and second bellows will move due to the difference in size to cause a change in pressure in the first chamber as an integrated function of change in pressure in the second chamber, and means for supplying a feedback movement to the valve member to change the progressive movement thereof initiated by change in pressure in said second chamber.

4. A pneumatic relay comprising a first chamber having an inlet orifice opening into the chamber and an outlet orifice opening from the chamber, a movable control valve member positioned to change the flow through the inlet and the outlet orifices with movement, a second chamber having an inlet opening to receive an input pressure signal, a first movable wall exposed to the pressure in said first chamber, a second movable wall having one surface exposed to the pressure in said second chamber and being of an area less than said first wall, means forming a third closed chamber between said walls, means interconnecting said first and second walls to said valve member whereby movement of the walls will change the pressure in said first chamber by moving said valve member in a direction to cause a corresponding change in pressure for the first chamber, a signal outlet passage leading from the first chamber to a load to supply an ouptut pressure signal, and a passage communicating between said first and third chambers whereby change in pressure in said first chamber will cause a corresponding change in said third chamber and a progressive movement of the valve member due to the difference in areas in said first and second walls whereby the pressure in the first chamber will change as an integral function of the pressure change in the second chamber.

5. A pneumatic relay comprising a first chamber having an inlet orifice opening into the chamber and an outlet orifice opening from the chamber, a movable control valve member positioned to change the flow through the inlet and the outlet orifices with movement, a second chamber having an inlet opening to receive an input pressure signal, a first movable wall exposed to the pressure in said first chamber, a second movable wall having one surface exposed to the pressure in said second chamber and being of an area less than said first wall, means forming a third closed chamber between said walls, means interconnecting said first and second walls to said valve member whereby movement of the walls will change the pressure in said first chamber by moving said valve member in a direction to cause a corresponding change in pressure for the first chamber, a signal outlet passage leading from the first chamber to a load to supply an output pressure signal, a passage communicating between said first and third chamber whereby change in pressure in said first chamber will cause a corresponding change in said third chamber and a progressive movement of the valve member due to the difference in areas in said first and second walls whereby the pressure in the first chamber will change as an integral function of the pressure change in the second chamber, and an adjustable restricting valve in said passage to selectively control the rate of flow therethrough whereby the time constant of the integrated rate of change in pressure in the first chamber is controlled.

6. A pressure relay comprising in combination a casing defining a first chamber having an inlet orifice opening into the chamber and an outlet orifice opening from the chamber with said orifices positioned in opposition to each other, a valve flapper pivotally mounted within said chamber and having a free end movably positioned between said inlet and outlet orifices to simultaneously change the flow through said orifices with movement therebetween, a first movable wall having one surface exposed to the pressure in said first chamber, a second chamber defined within said casing and having an inlet opening to receive an input pressure signal, a second movable wall having a cross-sectional area less than said first movable wall and having a surface exposed to the second chamber, means sealing said walls to form a third chamber therebetween, means mechanically connecting said first and second walls to each other and to an end of the valve flapper whereby movement of the walls with change in pressure in said chambers will change the position of said flapper with respect to the inlet and outlet orifices, a fourth chamber within said casing provided with a movable wall mechanically interconnected to said flapper to act in opposition to said first and second walls with pressure change in the fourth chamber, a pressure signal outlet from the first chamber for controlling a load, a pressure feedback signal opening for leading from the load and communicating with said fourth chamber whereby a feedback pressure signal is translated into mechanical movement to adjust the position of the valve flapper with operation of the load, and a conduit connected between said first and third chamber whereby change in pressure in the first chamber will cause a corresponding change in pressure in the third chamber to cause simultaneous movement of the first and second walls due to the difference in area between said walls whereby the valve flapper will be moved and pressure within the first chamber will change as an integrated function of a pressure change in the second chamber.

7. A pneumatic relay comprising a first chamber having an inlet orifice opening into the chamber and an outlet orifice opening from the chamber, a movable control valve member positioned to change the flow through said inlet and outlet orifices with movement, a second chamber having an inlet opening to receive an input pressure signal, a first movable wall having one surface exposed to the pressure in said first chamber, a second movable wall having one surface exposed to the pressure in said second chamber, means forming a third closed chamber with the other surface of said second wall exposed to said third chamber, means interconnecting said first and second walls to said valve member whereby movement of the walls will change the pressure in said first chamber by moving said valve member in a direction to cause a corresponding change in pressure in the first chamber, a signal outlet passage leading from the first chamber to supply an output pressure signal, a feedback passage communicating between said first and third chambers with said feedback passage being the sole opening into said third chamber whereby change in pressure in said first chamber will cause a corresponding change in said third chamber, and an adjustable restricting valve in said feedback passage to selectively control the rate of flow therethrough so that the time constant of the rate of change in pressure in the third chamber due to change in the first chamber is controlled.

References Cited in the file of this patent

UNITED STATES PATENTS

| | | |
|---|---|---|
| 2,117,800 | Harrison et al. | May 17, 1938 |
| 2,202,485 | Fitch | May 28, 1940 |
| 2,301,301 | Mallory | Nov. 10, 1942 |
| 2,712,321 | Grogan | July 5, 1955 |
| 2,767,725 | Long | Oct. 23, 1956 |
| 2,829,663 | Freeman et al. | Apr. 8, 1958 |